Nov. 14, 1950
C. H. MARNACH ET AL
2,529,620
HUSKING AND CLEANING MACHINE
Filed May 19, 1948
2 Sheets-Sheet 1
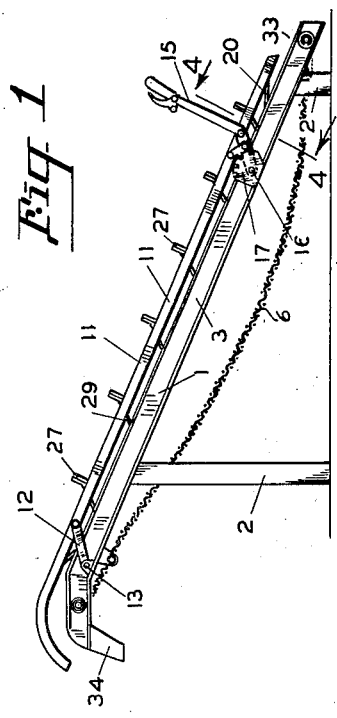
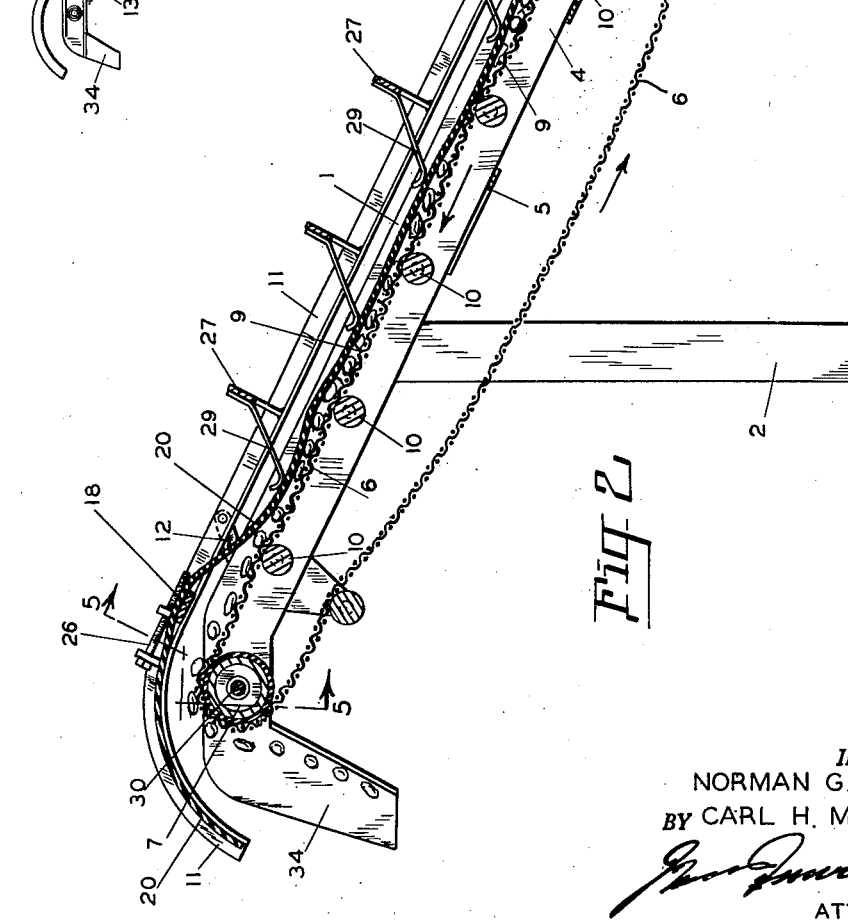
INVENTOR.
NORMAN G. SCHATZ
BY CARL H. MARNACH
ATTORNEY

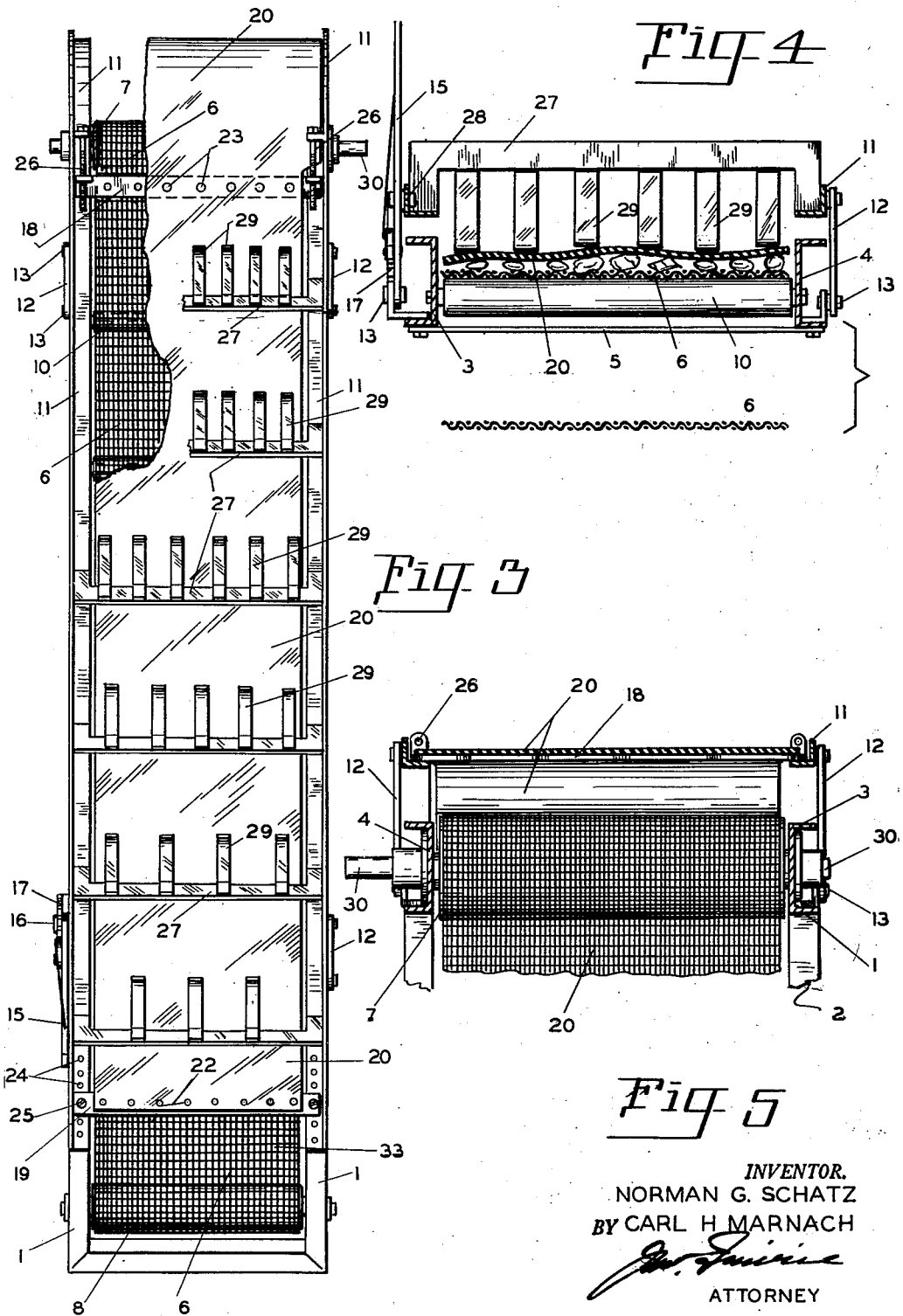

Patented Nov. 14, 1950

2,529,620

UNITED STATES PATENT OFFICE 2,529,620

HUSKING AND CLEANING MACHINE

Carl H. Marnach and Norman G. Schatz, Newberg, Oreg.

Application May 19, 1948, Serial No. 27,908

2 Claims. (Cl. 130—30)

This invention relates to husking and cleaning machines and is particularly adapted for the husking and cleaning nuts and particularly filberts and the like.

With our new and improved husking and cleaning machine, the husking and cleaning features are incorporated within a conveyor. This conveyor consists of a wire screen belt travelling under a stationary flexible apron. Means being provided for forcing the said apron against the surface of the said screen belt.

The primary object of our invention is to convey over a screen belt nuts and the like for the removing of the husks, dirt and leaves therefrom. This is accomplished by contacting the apron down on to the nuts, dirt and the like, forcing the same against the upper surface of the screen belt which is travelling underneath the apron. This action rolls the nuts between the apron and the screen belt removing the hulls. Also this action breaks up clods of dirt and the like forcing the same down through the screen belt as the nuts are conveyed therealong.

A further object of our invention is the providing of means for increasing or decreasing the pressure, applying the apron to the surface of the screen belt.

In the operation of our new and improved husking and cleaning machine, the nuts, dirt and leaves are fed into one end of the conveyor on to the said screen belt. This carries the said material along with the belt under the pressure of the apron completely throughout the length of the conveyor. In so doing the husks, as stated above, and the dirt are removed and separated from the nuts.

These and other incidental objects will be apparent in the drawings, specification and claims.

Referring to the drawings:

Figure 1 is a side view of our new and improved husking machine.

Figure 2 is a longitudinal sectional view taken through the machine.

Figure 3 is a plan view looking down on the machine.

Figure 4 is a cross sectional view taken on line 4—4 of Figure 1.

Figure 5 is a cross sectional detail view taken on line 5—5 of Figure 1.

Referring more specifically to the drawings:

Our new and improved husking and cleaning machine consists of a conveyor 1, mounted on suitable supports 2. This conveyor consists of side rails 3 and 4 tied together by cross bracing 5. We do not wish to be limited in supporting our machine on leg supports 2, as we actually support the same by framework associated with our pending application on nut picking machines, Serial Number 772,942.

In this machine we have a nut picking or gathering apparatus delivering the nuts on our new and improved husking and cleaning machine, and also we have an additional machine into which the nuts are delivered from our husking machine, further removing the leaves and delivering the nuts to sacking stations. We feel that this particular machine can be used separately or with other picking machines as well as the one in which we have just described.

A screen belt 6 is trained about the driving roller 7 at its one end and the idler roller 8 at its opposite end, best illustrated in Figures 2 and 3. The upper run 9 of the screen belt travels over the idler rollers 10 maintaining the same in approximately a straight line. Our machine further consists of adjustable frames 11 pivotally connected to the rails 3 and 4 of the conveyor 1 by the links 12, which are pivotally mounted at their one end to the side rails of the conveyor 1 at 13 and to the frames 11 at 14, one of the links 12 is substituted by the lever 15 which is pivotally mounted at 16 to the conveyor 1 and having the quadrant 17 associated therewith for holding the lever in the desired angle.

By pushing the lever, referring to Figure 1, in the direction of the arrow, the frame 11 is raised or separated away from the conveyor rails 3 and 4 and vice versa, the frame 11 is brought closer to the said side rails when the lever is moved in the opposite direction of the arrow, the object of which will be later described.

Cross members 18 and 19 space the frames 11 apart and also supports the apron 20, which is preferably made from rubber belting or the like. The lower end 21 of the apron is secured to the member 19 by suitable means as rivets 22, the upper end of the apron is secured to the member 18 by similar rivets. The member 19 is adjustable along the frames 11 by changing the same to the various holes 24, which receive the holding bolts 25 associated with the frame 11 and the member 19. This provides for a coarse adjustment relative to the strength applied to the apron 20. The member 18 is adjustable along the frames 11 by the tension bolt 26 for the various adjustments relative to the tension on the apron.

Referring to Figures 2 and 4, cross frames or bridges 27 are preferably welded or otherwise secured to the frames 11 at 28. These bridges have the spring fingers 29 secured thereto by any suitable means. It will be noted that the number of spring elements are increased in number on these bridges from the lower end of the conveyor to the upper end, which will be described later.

We will now describe the operation of our new and improved husking and cleaning machine. The driving roller 7 is driven from the drive shaft 30 by any suitable means. This will move the screen belt 6 in the direction of the arrows. The nuts 31 and the dirt 32 are fed on to the belts 6 at 33. They travel under the apron 20. The apron 20 is held stationary by the cross member 19 while the spring fingers 29 bear down on the top of the apron forcing the same against the upper run 9 of the belt 6.

In the case of the nuts they will be rolled over and over due to the action of the belt pulling them past the stationary apron. This action will remove the husks therefrom while the clods of dirt will be crushed and forced down through the upper run 9 of the belt 6 by the pressure applied to the apron by the spring fingers 29. This pressure is varied by raising or lowering the frames 11 by the lever 15 varying the pressure applied to the apron by the fingers 29. The fingers 29 vary in their spacing as best illustrated in Figure 3 so as to fully and completely cover the surface of the apron 20 and the screen belt 6.

The fact that the pressure can be varied on these fingers is one of the outstanding features our invention. The nuts after having been husked are delivered over the upper end of the belt 6 by way of the chute 34.

What we claim is:

1. A nut husking and cleaning machine comprising a first frame, an endless flexible conveyor screen supported in said frame, a series of spaced idler rollers mounted in said frame and engaging the lower side of the upper conveyor run between the ends thereof, a loosely suspended apron secured to said frame above and in engagement with the upper conveyor run, a second frame movable longitudinally of said first frame and simultaneously movable toward and away from said apron, a series of resilient fingers mounted on said second frame above and in engagement with the apron for depressing the apron against the conveyor, operable means for moving the second frame lengthwise of the first frame in either direction and simultaneously at right angles to the frame and apron, said operable means being links and also comprising means holding the second frame in a predetermined position relative to the first means.

2. The machine according to claim 1 and wherein the last-mentioned means includes a quadrant associated with one of the links.

CARL H. MARNACH.
NORMAN G. SCHATZ.

REFERENCES CITED

The following references are of record in the file of this patent:

UNITED STATES PATENTS

| Number | Name | Date |
|---|---|---|
| Re. 13,717 | Lilliston | Apr. 21, 1914 |
| 693,296 | Thomas | Feb. 25, 1902 |
| 1,388,394 | Witt | Aug. 23, 1921 |
| 2,257,351 | Silver | Sept. 30, 1941 |
| 2,433,730 | Bridge | Dec. 30, 1947 |

FOREIGN PATENTS

| Number | Country | Date |
|---|---|---|
| 564,162 | Germany | Nov. 14, 1932 |